April 14, 1931. F. BOEDECKER 1,801,068
MANUFACTURE OF THE ISOMERIC MONOETHYL ETHERS
OF PROTOCATECHUIC ALDEHYDE
Filed Nov. 19, 1927
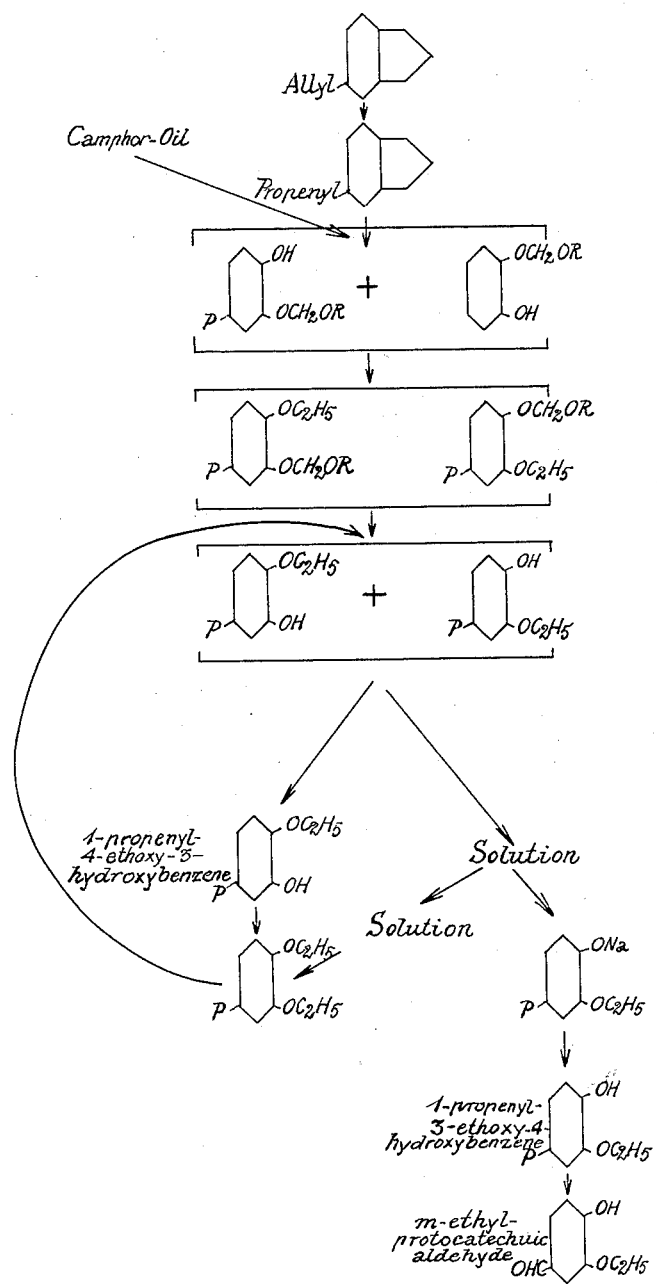

Patented Apr. 14, 1931

1,801,068

UNITED STATES PATENT OFFICE

FRIEDRICH BOEDECKER, OF BERLIN-DAHLEM, GERMANY

MANUFACTURE OF THE ISOMERIC MONOETHYL ETHERS OF PROTOCATECHUIC ALDEHYDE

Application filed November 19, 1927, Serial No. 234,557, and in Germany January 24, 1927.

This invention relates to the manufacture of the isomeric mono-ethyl ethers of protocatechuic aldehyde $C_6H_3.OH.OC_2H_5.CHO$.

In my copending application Ser. No. 146,850, filed Nov. 6, 1926, I have described a process for manufacturing vanillin being a mono-methyl ether of protocatechuic aldehyde, from safrol or i-safrol, being 1-2 dihydroxybenzene methylene ethers substituted in the 4-position by an univalent unbranched alkylene radical $C_3H_5$. Now I have found that the corresponding ethyl ether, which is likewise a valuable odoriferous substance, may be obtained and separated from the accompanying isomeric ether in a quite similar way, owing to the fact that 1. 1-propenyl-4-ethoxy-3-hydroxybenzene is less soluble than 1-propenyl-3-ethoxy-4-hydroxybenzene;

2. The alkali metal salts as well as the acylated compounds of the 3-ethoxy-compound are less soluble than the corresponding 4-ethoxy-compound;

3. m-ethyl-protocatechuic aldehyde is soluble in alkali metal carbonate solutions, in contradistinction to p-ethyl-protocatechuic aldehyde.

Furthermore I have found that instead of safrol, camphor oil may be used as starting material, it being only necessary to treat the product of the splitting operation, after removal of the alcohol, with inert solvents, whereby the substances accompanying the safrol in the camphor oil, are completely removed after having served as desirable diluents during the splitting operation.

When treating the product obtained by splitting safrol or i-safrol with alcoholic alkali or an alcoholic alkali metal alcoholate solution, after separation of the unchanged material—with ethylating means, for instance, with an ethyl halogenide, and then heating the resulting mixtures with diluted acids, preferably in alcoholic solution, a mixture of the two isomeric propenyl-pyrocatechine-mono-ethyl ethers is obtained.

For better comprehension the steps of the process are illustrated in the annexed drawing which is self-explanatory.

Example 1

1 kilogram of safrol is heated with 3 liters of methylalcoholic caustic potash solution in a stirring-autoclave to 130–140° C. for about 20 hours. Then the methyl alcohol is distilled off, the residue dissolved in a little water, and the solution extracted by shaking it with benzene. The benzene solution on distilling off the solvent leaves 30 grams of a residue consisting of i-chavibetol. From the remaining aqueous-alcoholic solution an oil is separated by acidifying substantially consisting of a mixture of p- and m-propenyl-pyrocatechine-mono-methoxy-methyl ether

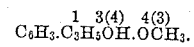
$$C_6H_3.C_3H_5OH.OCH_3.\overset{1\;3(4)\;4(3)}{}$$

175 grams of this mixture are dissolved in about 600 c. c. of an ethyl-alcoholic caustic potash solution of about 9%; 100 grams of ethyl bromide are added and the whole is heated in an autoclave to about 100° C. for 3 hours. Then the alcohol is distilled off and the residue dissolved in water and ether. The ethereal solution is washed with diluted caustic soda solution to remove a little quantity of the non-ethylated product. After distilling off the ether, the mixture of both the ethyl ethers distills at 163–165° C. (13 mm.) as a nearly colorless oil. The output amounts to 185 grams.

From the alkaline washing water about 8 grams of the non-ethylated body may be recovered.

170 grams of the ethyl ether mixture are dissolved in 1.1 liter of alcohol and, after the addition of 450 c. c. of water and some drops of 25% hydrochloric acid, the solution is refluxed for about 6 hours. Then the alcohol is distilled off and the remaining oil is dissolved in ether. For removing the remaining small amount of the unsaponified product the ethereal solution is extracted with diluted caustic soda solution and the phenols are again precipitated from the alkaline solution by acidulating. They are dissolved in ether, the solution is dried and, after evaporating the ether, the residue is distilled in vacuo. 125 grams of an oil boiling at 148–152° C. (14 mm.) and solidifying in the cold to a crystalline mass are obtained. The oil smells similar to eugenol.

The resulting mixture may be oxidized in the well-known manner to the corresponding aldehydes which may be separated into the isomers by means of an alkali metal carbonate as above mentioned.

Now it is possible to nearly completely work up the mixture of the two propenyl-pyrocatechine-mono-ethyl ethers to obtain the more valuable compound in which the ethoxy-group is in meta-position to the propenyl-group, and which on oxidation is transformed into the m-ethyl ether of protocatechuic aldehyde. A practical way of operating is as follows:

Firstly the p-compound of higher fusing-point is separated from the above-mentioned mixture by freezing-out and transformed into the di-ethyl ether by treating the same with ethylating means, such as di-ethyl sulfate or an ethyl halogenide &c. On heating the di-ethyl ether with an aqueous or alcoholic alkali solution, preferably at a temperature between 100° and 150° C. again a mixture of both mono-ethyl ethers is obtained. The best output however is obtained by using solutions of alkali metal alcoholates in strong, preferably absolute alcohol. In this case not only a far smaller excess of splitting agent is needed which is to be recommended in any case, but moreover the output is considerably increased, so that advantages are obtained in two directions. From the resulting mixture the main quantity of the p-compound may be separated by freezing out as above described. By again subjecting the mixture to the above described operation, preferably together with the p-compound firstly separated from the mixture in the next batch, the p-compound may by degress be almost wholly converted into the m-compound..

The working-up of the product contained in the filtrates after the removal of the p-ethyl-propenyl-pyrocatechine ether is now accomplished by transforming the product into its acyl-compounds containing the benzoyl radical or derivatives thereof, as, for instance, the nitrobenzoyl group. In this case the conditions of solubility are quite reversed as compared with those of the free phenol ethers, the said acyl-compounds of the m-ethyl ether being less soluble than those of the p-compound. Therefore it is possible, for instance by recrystallizing the benzoylated raw products, preferably from hydrocarbons, to obtain a quite pure p-benzoyl-m-ethyl-propenyl-pyrocatechine having a fusing-point of 89° C. which on saponification with an alkali yields the free phenol ether.

The raw product of the m-ethyl ether of propenyl-pyrocatechine may also be purified by the way of its sodium salt. I have ascertained that the alkali metal salts of the propenyl-pyrocatechine ether, ethylated in m-position to the propenyl group, are less soluble in water, alcohol &c. than the corresponding p-compound. Therefore the m-substituted ether may be separated from a solution containing the said phenols (and, to all appearances, still further isomers) in the form of an alkali metal salt, after the main quantity of the propenyl-pyrocatechine-p-ethyl ether has been frozen out.

*Example 2*

123 grams of the phenol mixture obtained according to the above example 1 are dissolved in 120 c. c. of hexahydrotoluene. On cooling down, the p-ether crystallizes out; it is filtered off by suction whereby 45 grams of the product are obtained. The pure product may be recovered by recrystallization from hexahydrotoluene, showing a fusing-point of 84–85° C. Fusing-point of the acetate 68–69° C., of the benzoate 60–61° C.

The mother liquor is freed from the solvent and the residue dissolved by heating with 180 c. c. of a 10% caustic soda solution. On cooling down, a sodium salt crystallizes out; this is filtered off by suction, washed with diluted sodium chloride solution and recrystallized anew from water from which it comes out in long needles. It is dissolved in water, decomposed by diluted acid, absorbed in ether, dried and subjected to distillation. Boiling-point 145° C. (13 mm.). The fusing-point of the recrystallized product is 55° C. Output 45 grams. Fusing-point of the benzoate 89° C., of the acetate 39–41° C.

From the mother liquors of the sodium salt a third fraction is recovered by acidulating from which another small portion of the p-ether may be obtained by means of hexahydrotoluene.

The solution resulting from the separation of the propenyl-pyrocatechine-m-methyl ether in the form of its alkali metal salt produces, on acidulating, an oil amounting to about one fifth of the treated mixture of the m-and the p-ether. However I did not succeed, even with the above-described operations, in separating therefrom the two propenyl-pyrocatechine ethers after freezing out the remainders of the p-ethyl ether. This may be due to the presence of further (probably cis- and transisomeric) compounds. I have now discovered the surprising fact that the desired result can be attained by ethylating the mixture of phenols in question and splitting the thoroughly ethylated product by heating it with an alkali. From the resulting reaction product both the m- as well as the p-ethyl ether of propenyl-pyrocatechine can easily be obtained according to the method described in the foregoing paragraph. Again a non-crystallizable oil amounting to about one fifth of the starting material is obtained which may be treated in the above-described manner, preferably together with a fresh batch, to obtain the two isomers. In doing this it is not necessary to start from the oil itself, but, for instance, when ethylating with diethyl sulfate I may start directly with the solution resulting from the separation of the difficultly soluble sodium salt.

It it is desired to obtain merely propenyl-1-hydroxy-3-ethoxy-4-benzene or the p-ethyl ether of the protocatechuic aldehyde the filtrate obtained after freezing out the p-ether from mixtures containing both isomers is worked up in the manner above-described for treating the p-ether with a view of obtaining the m-isomeric compound, that is to say by transforming the product into the diethyl ether and decomposing the latter to a mixture of hydroxy-3-ethoxy-4- and ethoxy-3-hydroxy-4-propenyl-1-benzene which may be treated again as above described.

The propenyl-pyrocatechine-mono-ethyl ethers are transformed in the well-known manner by means of suitable oxidants such as ozone into the two ethyl ethers of protocatechuic aldehyde.

As already mentioned, camphor oil may be used as starting material instead of safrol in connection with the here described process. For instance, when 800 parts, by weight, of camphor oil containing 60% of safrol are treated with 480 parts of caustic soda and 1000 parts of methyl alcohol in the manner above described for safrol, 400 parts of the methoxy-methyl ether mixture are obtained on acidulating, after 360 parts of products insoluble in alkalies have previously been withdrawn from the solution by means of benzene. These insoluble products substantially consist of the hydrocarbons contained in camphor oil besides about 6% of safrol. The methoxy-methyl ether mixture is further treated according to the above-described methods.

I claim:—

1. Process of producing the 3-ethyl ether of protocatechuic aldehyde, comprising treating 1-2-dihydroxybenzene methylene ether substituted in the 4-position by a univalent unbranched alkylene radical $C_3H_5$ at elevated temperatures with alcoholic alkali, ethylating the reaction product, removing from the resulting mixture of the propenyl-orthodihydrobenzene-monoethyl ethers the 4-propenyl-1,2-dihydroxybenzene-1-ethyl ether by freezing out, converting the remaining more soluble propenyl-orthodihydroxybenzene monoethers into their alkali metal salts, thereby removing from them the less soluble alkali metal salt of the 4-propenyl-1,2-dihydroxybenzene-2-ethyl ether, decomposing the said salt by an acid and oxidizing the resulting 4-propenyl-1,2-dihydroxybenzene-2-ethyl ether to the 3-ethyl ether of protocatechuic aldehyde.

2. Process of producing the 3-ethyl ether of protocatechuic aldehyde, comprising treating 1-2-dihydroxybenzene methylene ether substituted in the 4-position by a univalent unbranched alkylene radical $C_3H_5$ at elevated temperatures with alcoholic alkali, ethylating the reaction product, removing from the resulting mixture of the propenyl-orthodihydroxybenzene-monoethyl ethers the 4-propenyl-1-monoethyl ether by freezing out, converting the remaining more soluble propenyl orthodihydroxybenzene-monoethers into their alkali metal salts, thereby removing from them the less soluble alkali metal salt of the 4-propenyl-2-ethyl ether and decomposing the said salt by an acid, ethylating the remaining mixture of propenyl-ortho-dihydroxybenzene-monoethyl-ethers, heating with alcoholic alkali, acidulating, again returning the remaining mixture into the process, and oxidizing the 4-propenyl-1,2-dihydroxybenzene-2-ethyl ether to the 3-ethyl ether of protocatechuic aldehyde.

3. Process of producing the 3-ethyl ether of protocatechuic aldehyde, comprising treating 1-2-dihydroxybenzene methylene ether substituted in the 4-position by a univalent unbranched alkylene radical $C_3H_5$ at elevated temperatures with alcoholic alkali, ethylating the reaction product, removing from the resulting mixture of the propenyl-orthodihydroxybenzene-monoethyl ethers the 4-propenyl-1-monoethyl ether by freezing out, converting the propenyl-orthodihydroxybenzene monoethers into their alkali metal salts, thereby removing from them the less soluble alkali metal salt of the 4-propenyl-2-ethyl ether, and decomposing the said salt by an acid, ethylating the remaining mixture of propenyl-orthodihydroxybenzene-monoethyl ethers and the said 4-propenyl-1-monoethyl ether, heating with alcoholic alkali, acidulating, again returning the remaining mixture into the process, and oxidizing the 4-propenyl-1,2-dihydroxybenzene-2-ethyl ether to the 3-ethyl ether of protocatechuic aldehye.

4. In the process of producing the 3-ethyl ether of protocatechuic aldehyde, the steps comprising treating 1-2-dihydroxybenzene methylene ether substituted in the 4-position by a univalent unbranched alkylene radical $C_3H_5$ at elevated temperatures with alcoholic alkali, ethylating the reaction product, removing from the resulting mixture of the propenyl-orthodihydroxybenzene-monoethyl ethers the 4-propenyl-1,2-dihydroxybenzene-1-ethyl ether by freezing out, converting the remaining more soluble propenyl-orthodihydroxybenzene monoethers into their alkali metal salts, thereby removing from them the less soluble metal salt of the 4-propenyl-1,2-dihydroxybenzene-2-ethyl ether, and decomposing the said salt by an acid.

5. Process of producing the 3-ethyl ether of protocatechuic aldehyde comprising treating camphor oil with alcoholic alkali, removing the alcohol, extracting the product after addition of water with an inert solvent, treating the mixture of phenolethers with ethylating means, removing from the resulting mixture of the propenyl-orthodihydrobenzene-monoethyl ethers the 4-propenyl-1,2-dihydroxybenzene-1-ethyl ether by freezing out, converting the remaining more soluble propenyl-orthodihydroxybenzene monoethers into their alkali metal salts, thereby removing from them the less soluble alkali metal salt of the 4-propenyl-1,2-dihydroxybenzene-2-ethyl ether, decomposing the said salt by an acid and oxidizing the resulting 4-propenyl-1,2-dihydroxybenzene-2-ethyl ether to the 3-ethyl ether of protocatechuic aldehyde.

6. Process of producing the 3-ethyl ether of protocatechuic aldehyde, comprising treating 1-2-dihydroxybenzene methylene ether substituted in the 4-position by a univalent unbranched alkylene radical $C_3H_5$ at elevated temperatures with alcoholic alkali, ethylating the reaction product, removing from the resulting mixture of the propenyl-orthodihydroxybenzene-monoethyl ethers the 4-propenyl-1-monoethyl ether by freezing out, converting the remaining more soluble propenyl-orthodihydroxybenzene monoethers into their alkali metal salts, thereby removing from them the less soluble alkali metal salt of the 4-propenyl-2-ethyl ether and decomposing the said salt by an acid, ethylating the remaining mixture of propenyl-orthodihydroxybenzene monoethyl ethers, heating with alcoholic alkali metal alcoholate solution, acidulating, again returning the remaining mixture into the process, and oxidizing the 4-propenyl-1,2-dihydroxybenzene-2-ethyl ether to the 3-ethyl ether of protocatechuic aldehyde.

7. Process of producing the 3-ethyl ether of protocatechuic aldehyde, comprising treating 1-2-dihydroxybenzene methylene ether substituted in the 4-position by a univalent unbranched alkylene radical $C_3H_5$ at elevated temperatures with alcoholic alakli, ethylating the reaction product, removing from the resulting mixture of the propenyl-orthodihydroxybenzene-monoethyl ethers the 4-propenyl-1-monoethyl ether by freezing out, converting the propenyl-orthodihydroxybenzene monoethers into their alkali metal salts, thereby removing from them the less soluble alkali metal salt of the 4-propenyl-2-ethyl ether, and decomposing the said salt by an acid ethylating the remaining mixture of propenyl-orthodihydroxybenzene-monoethyl ethers and the said 4-propenyl-1-monoethyl ether, heating with alcoholic alkali metal alcoholate solution, acidulating, again returning the remaining mixture into the process, and oxidizing the 4-propenyl-1,2-dihydroxybenzene-2-ethyl ether to the 3-ethyl ether of protocatechuic aldehyde.

8. As a new composition of matter, an equimolecular mixture of two isomeric phenol ethers having the formulæ 4-alkoxymethoxy-3-ethoxy-1-propenylbenzol, and 4-ethoxy-3-alkoxymethoxy-1-propenylbenzol.

9. As a new composition of matter, an equimolecular mixture of two isomeric phenol ethers having the formulæ 4-ethoxy-3-hydroxy-1-propenylbenzol and 4-hydroxy-3-ethoxy-1-propenylbenzol.

In testimony whereof I affix my signature.

FRIEDRICH BOEDECKER.